United States Patent
Hasan et al.

(10) Patent No.: US 10,674,374 B2
(45) Date of Patent: Jun. 2, 2020

(54) PORTABLE SPECTRUM RECORDING AND PLAYBACK APPARATUS AND ASSOCIATED SITE MODEL

(71) Applicant: General Electric Company, Schenectady, NY (US)

(72) Inventors: S M Hasan, Rexford, NY (US); Paulo Rodrigues Ferreira, Niskayuna, NY (US); Tuomas Laine, Helsinki (FI); Trang Thai, Hillsboro, OR (US); Kevin Dufel, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/058,483

(22) Filed: Aug. 8, 2018

(65) Prior Publication Data
US 2020/0053574 A1 Feb. 13, 2020

(51) Int. Cl.
*H04W 24/06* (2009.01)
*H04W 24/02* (2009.01)
(Continued)

(52) U.S. Cl.
CPC ........... *H04W 16/225* (2013.01); *H04W 4/33* (2018.02); *H04W 24/02* (2013.01); *H04W 24/06* (2013.01)

(58) Field of Classification Search
CPC . H04L 41/145; H04L 41/147; H04L 41/5038; H04W 24/08
See application file for complete search history.

(56) References Cited

U.S. PATENT DOCUMENTS

| 6,806,808 B1 | 10/2004 | Watters et al. |
| 2004/0203436 A1* | 10/2004 | Oesterling ............. H04B 17/20 455/67.11 |

(Continued)

OTHER PUBLICATIONS

"RF Signal Recording and Analysis," Keysigh Technologies, retrieved from the internet https://www.keysight.com/main/editorial.jspx?cc=US&lc=eng&ckey=2107377&nid=null&id=2107377, on Aug. 8, 2018, 1 page.

(Continued)

*Primary Examiner* — David Bilodeau
(74) *Attorney, Agent, or Firm* — Hanley, Flight and Zimmerman, LLC

(57) ABSTRACT

Apparatus, systems and articles of manufacture to provide improved, dynamic wireless spectrum analysis in a healthcare environment are disclosed and described. An example apparatus includes radios to capture wireless signal information in an environment. The example apparatus includes a processor to activate and configure one or more of the radios according to a center frequency and/or a bandwidth to capture wireless signal information associated with the center frequency and/or bandwidth. The example processor is to generate a model of wireless signal activity based on the captured wireless signal information. The example model is to facilitate testing of a device according to the wireless signal activity in the environment. The example apparatus is to be portable to be positioned in the environment to capture the wireless signal information in the environment according to the one or more radios activated and configured by the processor for the environment.

20 Claims, 9 Drawing Sheets

(51) Int. Cl.
*H04W 16/22* (2009.01)
*H04W 4/33* (2018.01)

(56) References Cited

U.S. PATENT DOCUMENTS

| | | | | |
|---|---|---|---|---|
| 2005/0053008 | A1* | 3/2005 | Griesing | H04L 43/50 370/241 |
| 2008/0268892 | A1* | 10/2008 | Hamdi | H04W 52/283 455/522 |
| 2013/0272457 | A1 | 10/2013 | Ilie et al. | |
| 2014/0304207 | A1* | 10/2014 | Chandrayana | H04L 29/08072 706/48 |
| 2015/0103685 | A1* | 4/2015 | Butchko | H04L 43/50 370/252 |
| 2015/0189528 | A1* | 7/2015 | Carbajal | H04W 24/08 370/252 |
| 2016/0014613 | A1* | 1/2016 | Ponnampalam | H04W 16/18 370/254 |
| 2016/0127931 | A1* | 5/2016 | Baxley | G06F 16/285 455/67.16 |
| 2017/0290075 | A1* | 10/2017 | Carbajal | H04W 16/14 |
| 2017/0374573 | A1* | 12/2017 | Kleinbeck | H04W 16/14 |

OTHER PUBLICATIONS

"Averna Launches RF Record & Playback with Real-Time GNSS Simulator," Jun. 17, 2015—By GPS World Staff, retrieved from the internet http://gpsworld.com/averna-launches-rf-record-playback-with-real-time-gnss-simulator/, on Aug. 8, 2018, 6 pages.

"X-COM Systems Real-Time RF Signal Recording and Playback System Sets Benchmark for Instantaneous Bandwidth and Dynamic Range", Feb. 2015, retrieved from the internet https://birdrf.com/AboutUs/News/X-COM-Systems-Real-Time-RF-Signal-Recording-and-Playback-System-Sets-Benchmark.aspx, on Aug. 8, 2018, 5 pages.

Test & Measurement from Rohde and Schwarz, retrieved from the internet https://www.rohde-schwarz.com/us/solutions/test-and-measurement/overview/test-and-measurement-overview_232778.html?rusprivacypolicy=1, on Aug. 8, 2018, 11 pages.

* cited by examiner

US 10,674,374 B2

PORTABLE SPECTRUM RECORDING AND PLAYBACK APPARATUS AND ASSOCIATED SITE MODEL

FIELD OF THE DISCLOSURE

This disclosure relates generally to wireless spectrum analysis, and, more particularly, to a portable spectrum recording and playback apparatus and associated site model.

BACKGROUND

An abundance of electronic devices and wireless communication have crowded the airwaves with communication traffic. In some environments, communication latency and communication loss represent an annoyance. In other environments, such as healthcare, loss of data and excessive delay in communication can impact patient health and safety.

In wireless patient monitoring, for example, device(s) on a patient use, by default, frequencies within a pre-defined spectrum (e.g., an industrial, scientific and medical (ISM) radio band such as 2.4-2.4835 GHz, etc.) for transmitting and receiving patient sensor data. While operating in a healthcare facility, such as a hospital, etc., these devices have access to a protected frequency spectrum known as a medical body area network (MBAN, such as 2360-2400 MHz, etc.). MBAN spectrum is split into two sub-bands (2360-2390 MHz and 2390-2400 MHz) and, for the purposes of this disclosure, the following differences are highlighted. The 2360-2390 MHz spectrum is subject to Frequency Coordination per FCC Part 95.2509 and use of this spectrum is restricted to indoors only. The 2390-2400 MHz frequency band does not require frequency coordination and does not have restrictions on whether it can operate indoors or outdoors. For example, within the healthcare facility, an MBAN device can be authorized for access to the MBAN spectrum (2.36-2.39 GHz) from a third-party Frequency Coordinator regulated by the Federal Communications Commission (FCC). However, once the device leaves the healthcare facility, access to the pre-defined, reserved, or "protected" MBAN communication spectrum is denied.

A body area network is a wireless network of wearable computing devices. An MBAN is a wireless network of wearable computing devices that monitor and/or affect patient health, such as sensors, pumps, meters, monitors, etc. An MBAN is a low power network including a plurality of body-worn sensors that transmit a variety of patient data (e.g., temperature, blood glucose level, blood pressure, pulse and respiratory function, etc.) to a control device. The MBAN eliminates cables tethering the patient to a bed and provides real-time (or substantially real time given data transmission and processing latency) data to healthcare practitioners. Wireless medical devices can be used to actively monitor a patient's health, including blood glucose and pressure monitoring, delivery of electrocardiogram readings, neonatal monitoring, etc. Data can be gathered for storage, processing, transmission, etc., such as to a control device, patient electronic medical record, display, etc. Connected device(s) can also be used to deliver medical therapy to certain body area(s), for example.

Awareness of radio spectrum use can enable spectrum manager and automatic spectrum allocation systems, such as frequency coordinators, to operate more efficiently, reduce problems caused by spectrum congestion, and enable better mitigation of interference problems.

BRIEF DESCRIPTION OF THE DRAWINGS

The features and technical aspects of the system and method disclosed herein will become apparent in the following Detailed Description set forth below when taken in conjunction with the drawings in which like reference numerals indicate identical or functionally similar elements.

BRIEF DESCRIPTION

Figure 1A:
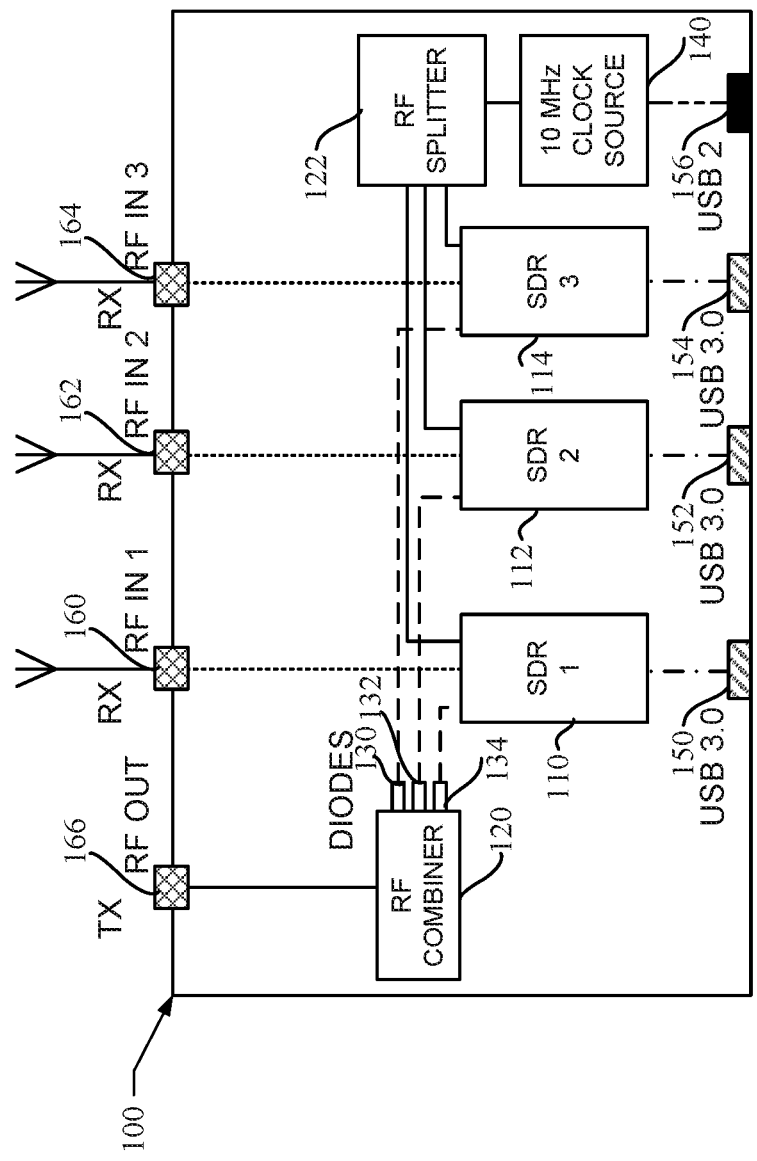
FIGS. 1A-1B illustrate an example radio box apparatus.

Certain examples disclosed herein facilitate improved wireless spectrum analysis in a healthcare environment. Certain examples disclosed herein provide a portable spectrum recording and playback apparatus and associated site model.

Certain examples provide an apparatus including a plurality of radios dynamically configurable to capture wireless signal information in an environment. The example apparatus includes a processor to activate and configure one or more of the plurality of radios according to at least one of a center frequency or a bandwidth to capture wireless signal information associated with the at least one of a center frequency or a bandwidth. The example processor is to generate a model of wireless signal activity in the environment based on the captured wireless signal information. The example model is to facilitate testing of a device according to the wireless signal activity in the environment. The example apparatus includes a data storage to store a recording of the captured wireless signal information and the model. The example apparatus is to be portable to be positioned in the environment to capture the wireless signal information in the environment according to the one or more of the plurality of radios activated and configured by the processor for the environment.

Certain examples provide at least one computer-readable storage medium including instructions that, when executed, cause at least one processor to implement at least: a configuration manager to determine a configuration for one or more of a plurality of radios to capture wireless signal information in an environment; a radio generator to apply the configuration to the plurality of radios to activate and configure the one or more radios according to at least one of a center frequency or a bandwidth to capture wireless signal information associated with the at least one of a center frequency or a bandwidth; a signal processor to process the wireless signal information captured by the one or more radios; a wireless modeler to generate a model of wireless signal activity in the environment from the processed wireless signal information, the model to facilitate testing of a device according to the wireless signal activity in the environment; and an output generator to provide the model for at least one of simulation or analysis.

Certain examples provide a method including determining, using at least one processor, a configuration for one or more of a plurality of radios to capture wireless signal information in an environment. The example method includes applying, using the at least one processor, the configuration to the plurality of radios to activate and configure the one or more radios according to at least one of a center frequency or a bandwidth to capture wireless signal information associated with the at least one of a center frequency or a bandwidth. The example method includes processing, using the at least one processor, the wireless signal information captured by the one or more radios. The example method includes generating, using the at least one processor, a model of wireless signal activity in the environment from the processed wireless signal information, the model to facilitate testing of a device according to the wireless signal activity in the environment. The example method includes outputting, using the at least one processor, the model for at least one of simulation or analysis.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

Example Portable Spectrum Recording and Playback Systems and Associated Methods

Certain examples of the presently disclosed technology provide improved hardware and/or software radios and associated control to record radiofrequency (RF) spectrum information and play back the recorded spectrum information to determine a map or model of communication spectra and activity in a given environment. Certain examples provide a control algorithm for a software defined radio to record RF spectrum and playback in real time (or substantially real time given data storage, processing, and communication latency) using one or more radios. The example control algorithm allows control of a center frequency at which each radio is tuned, as well as individual radio bandwidth, data resolution, and saving process, etc., for RF spectrum recording and/or playback.

During each recording and/or playback session, one or more radio center frequencies can be tuned to certain frequency(-ies) to make their covered bands adjacent and/or tuned to any other center frequency allowed by an associated radio specification. Within a recording and/or playback session, each radio can change its center frequency, bandwidth, and/or data resolution, as specified/requested by a user or other process controlling the session. A maximum rate at which these changes occur is limited by radio hardware specifications.

In certain examples, each radio can record and/or playback different or equal bandwidth signals, since a desired bandwidth can be achieved by matching radio specifications, a data rate bus, and one or more storage devices including the recording/playback device. In certain examples, a number of active radios used during each recording/playback session can be controlled according to a desired bandwidth to be covered at one or more desired frequencies that satisfy radio hardware specifications.

In certain examples, an RF recorder and playback device includes a radio box (e.g., including radio board(s), interface connector(s), clock generation and distribution electronics, etc.) attached to a processor and controlled by an algorithm running in software to monitor and obtain RF spectrum information for a monitored area. The example device is self-contained to enable RF spectrum recording activities to be performed wirelessly at different locations while the device is in motion, providing mobile RF spectrum recording. The example recording and playback device provides low weight, small form factor, low power consumption, and wide aggregated bandwidth which is also variable covering a wide frequency range (e.g., from 70 MHz up to 6 GHz, etc.), using one or more software defined radio (SDR) circuit boards. An associated control algorithm also provides scalability to use multiple radios in parallel to increase recording/playback bandwidth, for example.

Based on center frequency(-ies), total bandwidth(s) centered at different frequencies, and data resolution for each individual radio, the control algorithm determines 1) a number of radios to be active during a session, 2) a bandwidth for each radio to cover, 3) center frequency at which each radio is to tune, and 4) a data resolution of each radio, for example.

In certain examples, the control algorithm receives input such as a request from a user and/or external process(es) including center frequency, bandwidth, and data resolution. Output(s) of the control algorithm include distributed controls and commands including configurations and radio parameters to each radio to perform a requested execution of recording or playing back of RF signals, for example.

The proposed control algorithm solves the problem of RF spectrum recording and playback of varying signal bandwidth, which can be set to different values prior to and/or within a recording/playback session. Recording and playback tasks can be performed by controlling multiple software defined radios (SDRs) at the same time through a centered control algorithm. Also, control of multiple radios allows different portions of the RF spectrum to be recorded/played back at the same time, with their individual bandwidths able to vary as mentioned above.

By controlling multiple radios at the same time, other problems can be solved, such as improving the quality of wideband signal recordings by tuning multiple radios at certain frequencies such that their bandwidths become adjacent and only the flat portion of each radio RF front-end filter is used, with the capability of adapting the individual radio's bandwidth, center frequency, and data resolution at any time, through the control algorithm.

Because the control algorithm is targeted to control multiple software defined radios, another problem solved is the recording of wideband RF spectrum for mobile and wireless applications that require real-world wideband signals to be recorded and then played back in laboratories for analysis and testing. These real-world signals usually occupy bandwidths larger than 20 MHz and require low-weight, low power consumption and small form factor of self-contained equipment to be deployed at the location without any additional infrastructure being provided. The self-contained radio equipment is to be 1) portable so that it can be carried around, and 2) wireless so that it does not rely on a power cord connected o outlet power, since the equipment may move at varying distances, varying speeds, and/or varying time durations. Such equipment includes a radio box with one or more radios, a control device hosting the control algorithm, and one or more data storage devices. In certain examples, a cavity or chamber forming the radio box that holds the radios allows for addition or removal of radios to provide a scalable solution).

Thus, certain examples facilitate simultaneous (or substantially simultaneous given data transmission, storage, and/or processing latency) recording of multiple different portions of RF spectrum, regardless of whether or not the different portions are adjacent, have equal bandwidths, are at different data resolution, etc. RF spectrum recording is controlled by a control algorithm that adaptively generates and distributes commands and radio parameters to multiple software-defined radios. In certain examples, non-linearities of an RF front-end can be suppressed by the addition of radios tuned at certain frequencies such that the flat portion of its bandwidth covers the non-linear portions of the bandwidths that are covered by adjacent radios. Thus, parameters such as center frequency, bandwidth, data resolution, etc., can be adjusted dynamically based on feedback and/or other input from a monitoring process, a user, controller, etc., to enable the apparatus to record and play back signals with variable bandwidth. Additional radio board can be added to increase total bandwidth covered and/or subtracted if less bandwidth is to be covered, etc.

A variety of facilities/environments (e.g., hospitals, malls, sports stadiums, schools, parks, forests, etc.) and/or embedded in a vehicle (e.g., cars, planes, drones, etc.) benefit from having their RF communication systems tested under real RF conditions because of the mobility and portability provided by certain examples, making it possible to capture a real-world spectrum signals in the same way wireless moving devices experience them while operating in real-world conditions.

Such recordings are important since they allow laboratory analysis and testing of new technologies capable of dealing with that specific RF environment. Mobile recording sessions can also be achieved on-the-go for high-speed scenarios such as moving vehicles (e.g., cars, motorcycles, drones, trains, aircrafts, helicopters, spacecraft), etc.

Currently, commercial and military grade RF spectrum recording and playback solutions do not aim to provide solutions with a scalable option of adding more radio units, and they do not include control software to manage additional radios. Certain examples improve upon and solve these deficiencies in the art by controlling multiple radios in a scalable fashion for RF recording and spectrum playback.

Additionally, certain examples provide a control algorithm to enable portable solutions with a scalable number of radios at a light weight and low cost (e.g., radios weighting only 24 grams each, with a cost of $750 per radio, and an estimated cost of $5,000 per unit containing 3 radios and a high-performance laptop, etc.). This represents a high price-drop compared to heavy solutions available in the market today, which are limited in number of radios and, thus, frequency bandwidth coverage capability (e.g., radios weighing over 3.75 pounds each, with a total weight of at least 35 pounds and a cost of $43,000, etc.).

Certain examples provides software designed to control multiple radios with a scalable number of radios and dynamic set of radio configuration(s) to cover a plurality of bandwidths. Certain examples accommodate different data types and provide a plurality of storage systems such as external storage, cloud storage, wireless storage, solid state device storage, etc. Certain examples provide a control algorithm to manage a scalable SDR with replaceable elements. Certain examples also provide an expandable radio chassis that accommodates removal and/or addition of radio boards. Certain examples are not only designed to deal with a scalable number of radios but also provide autonomous decision-making upon radio parameter configuration to achieve the best performance while consuming the minimum power within the radios current hardware specifications, allowing trade-offs between data quality, RF quality parameters, battery life and storage capacity, for example.

FIG. 1A illustrates an example radio box apparatus 100 including a plurality of internal radios and additional components to be connected to a computing device such as a laptop, tablet computer, handheld computer, smartphone, etc. As shown in the example of FIG. 1, the apparatus 100 includes a plurality of software defined radios (SDRs) 110-114 serving as internal radios for the radio box 100. The SDRs 110-114 can be implemented using field-programmable gate arrays (FPGAs) and/or other circuitry, for example. The example radio box apparatus 100 also includes an RF combiner 120 and an RF splitter 122. The RF combiner 120 combines signals from the SDR 110-114 via protection diodes 130-134, which are designed to protect the corresponding SDR 110-114 from reverse voltage and current that can flow from the RF combiner 110 back to the SDR 110-114. The protection or safety diodes 130-134 help to prevent the reverse voltage and/or current from damaging the SDR circuits 110-114. The RF splitter 122 distributes an RF signal generated by a clock source 140 among the SDR 110-114. A plurality of universal serial bus (USB) connections 150-156 provide input to the SDR 110-114 and the clock source 140. A plurality of RF antenna 160-166 interfaces with the SDR 110-114 and the RF combiner 120 to receive incoming RF signals on antenna 160-164 and to transmit an outgoing RF signal on antenna 166, for example. In certain examples, each antenna 160-166 can include and/or be connected to an attenuator that is programmable to adjust signal level and control path loss of incoming and/or outgoing signals.

In certain examples, multiple radios can be combined to achieve large bandwidth while remaining highly portable given that a laptop and/or other portable computing device can connect all of the radios at the same time for data recording. The system 100 can be attached to a laptop and run on a battery, for example. The mobility of the system 100 allows easy and fast recording of the RF ambience in high traffic environments such as hospitals, etc.

Figure 1B:
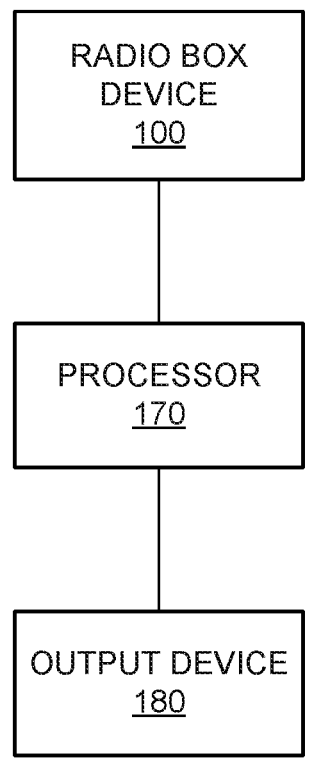

FIG. 1B shows an example in which the radio box apparatus 100 is connected to a processor 170 and an output device 180. The processor 170 can be used to configure the radio box device 100 for wireless signal capture and recording from a target environment. For example, frequency(-ies) and/or desired bandwidth can be specified via an input, configuration file, and/or other processor 170 setting and/or can be determined by the antenna 160-164 in the radio device 100, etc. Captured wireless spectrum information (e.g., waveforms, collisions, overlaps, etc.) can be output as a graphical user interface display, wireless activity model, data structure, etc., via the output device 180, for example. The output device 180 can include a display, a data storage, a data processing system, etc.

Figure 2:
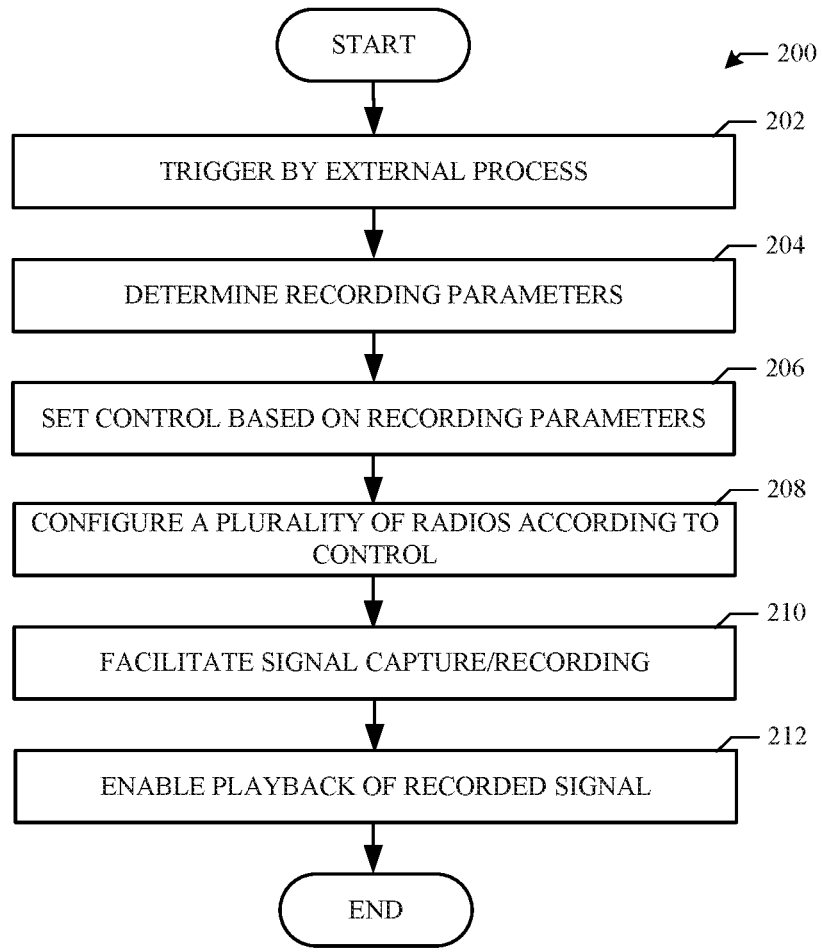
FIG. 2 illustrates a flow diagram of an example method to configure and activate the radio box apparatus of FIGS. 1A-1B.

FIG. 2 illustrates an example method 200 by which the radio apparatus 100 can be configured and used. At block 202, an external process triggers the radio apparatus 100. For example, a particular wireless device, environment in which wireless devices are used, wireless access point, test bed, communication and/or monitoring application, etc., can trigger capture and recording of RF signals within range of the radios 110-114 and associated antenna 160-164 in the example apparatus 100.

At block 204, recording parameters are determined for the radio apparatus 100. For example, radio center frequencies, individual and/or total bandwidths, data resolution, etc., can be determined for the radio apparatus 100. A particular device under test, target environment, etc., can influence and/or otherwise set recording parameters for the radio apparatus 100, for example. In certain examples, a bandwidth and/or frequencies of activity can be measured by the apparatus 100 to determine recording parameters to capture the available signal spectrum. In other examples, a desired bandwidth and/or center frequency(-ies) is set as one or more parameters for the apparatus 100.

At block 206, control is set based on the recording parameters. For example, an RF spectrum recorder/playback control algorithm is established based on the recording parameters determined and defined at block 204. Control can include a number of radios 110-114 and/or antenna 160-164 to use for recording based on a desired bandwidth to be recorded and/or other environmental/target conditions, for example. Thus, target center frequency(-ies), bandwidth(s), resolution, device under test, other environmental device(s), etc., dynamically factor in to form the control algorithm or routine to execute the radio apparatus 100 to capture and record signal data as defined in the control algorithm, for example.

At block 208, radio commands and/or parameters to control the radios are sent to radios 110-114 in the example apparatus 100 to configure the radios 110-114 according to the desired control. Thus, each radio 110-114 involved in the signal recording is configured with commands and/or parameters/settings according to the control algorithm and associated recording parameters defined at block 206.

At block 210, capture/recording of the RF signal(s) is facilitated by the radios 110-114 and associated antenna 160-164 according to the configured control. For example, the apparatus 100 executes data collection with the radio(s) 110-114 involved in the signal capture configured according to the control protocol and associated recording parameters.

At block 212, playback of the recorded RF signal content is enabled. For example, the apparatus 100 can output the recorded signal information (e.g., via a test bed, a connected laptop and/or other computing device with a screen, etc.) for evaluation. For example, a control program and/or other application can, alone or in conjunction with test bed circuitry, etc., play back and analyze the recorded signal information to generate a mapping of signals and associated frequency, bandwidth, etc., for the monitored environment. If a particular device is under test, an ability to the device to communicate can be analyzed based on the mapping or model of signal(s) in the monitored environment, for example.

Figure 3:
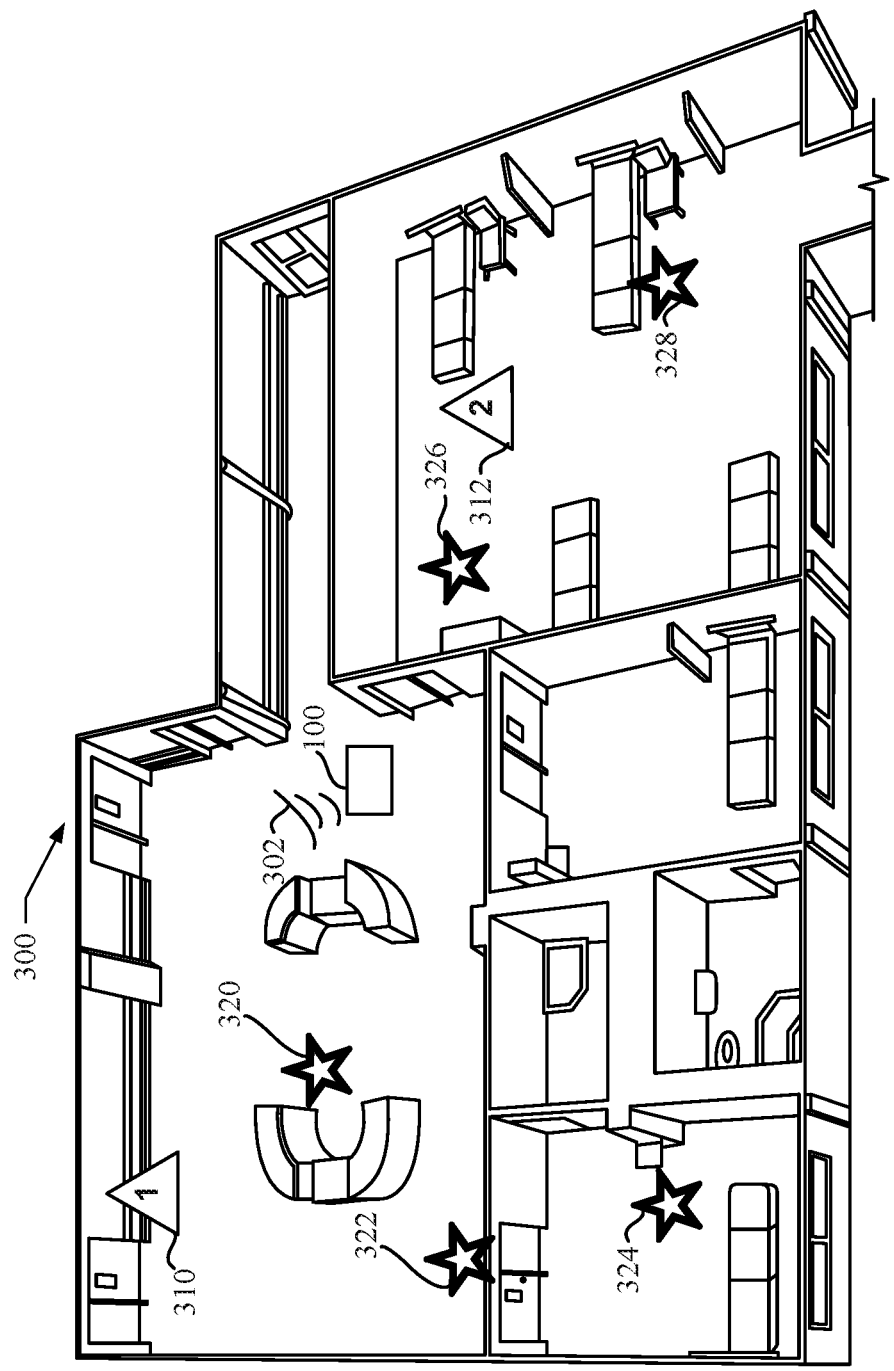
FIG. 3 illustrates an example environment in which wireless signal information can be captured, recorded, and analyzed using the method of FIG. 2 and the apparatus of FIGS. 1A-1B.

FIG. 3 illustrates an example environment 300 (e.g., a hospital and/or other healthcare facility, etc.) in which RF signal information can be captured, recorded, and analyzed. The example environment 300 includes the recording and playback system 100 (shown in FIG. 3 in recording mode receiving 302 captured RF signal information, etc.) as well as one or more wireless access points 310-312 (e.g., WiFi access points, Bluetooth beacons, etc.). The environment 300 can also include one or more wireless devices 320-328 that interfere with RF signal capture and analysis by the apparatus 100, for example.

For example, the recording and playback system 100 can be installed in a hospital, and signal recording can be performed at multiple times for a continuous recording duration at multiple locations in the facility 300 (e.g., based on use case(s) of a wireless device 320-328 under test, etc.). Recording duration can be limited by a data storage size of the computing device connected to and/or incorporated in the recording and playback apparatus 100. For example, the system 100 records and compresses data at a rate of 15 GB/s. The recorded data thus represents the environment 300 in which the wireless device(s) 320-328 under test should receive signal information, for example.

Figure 4:
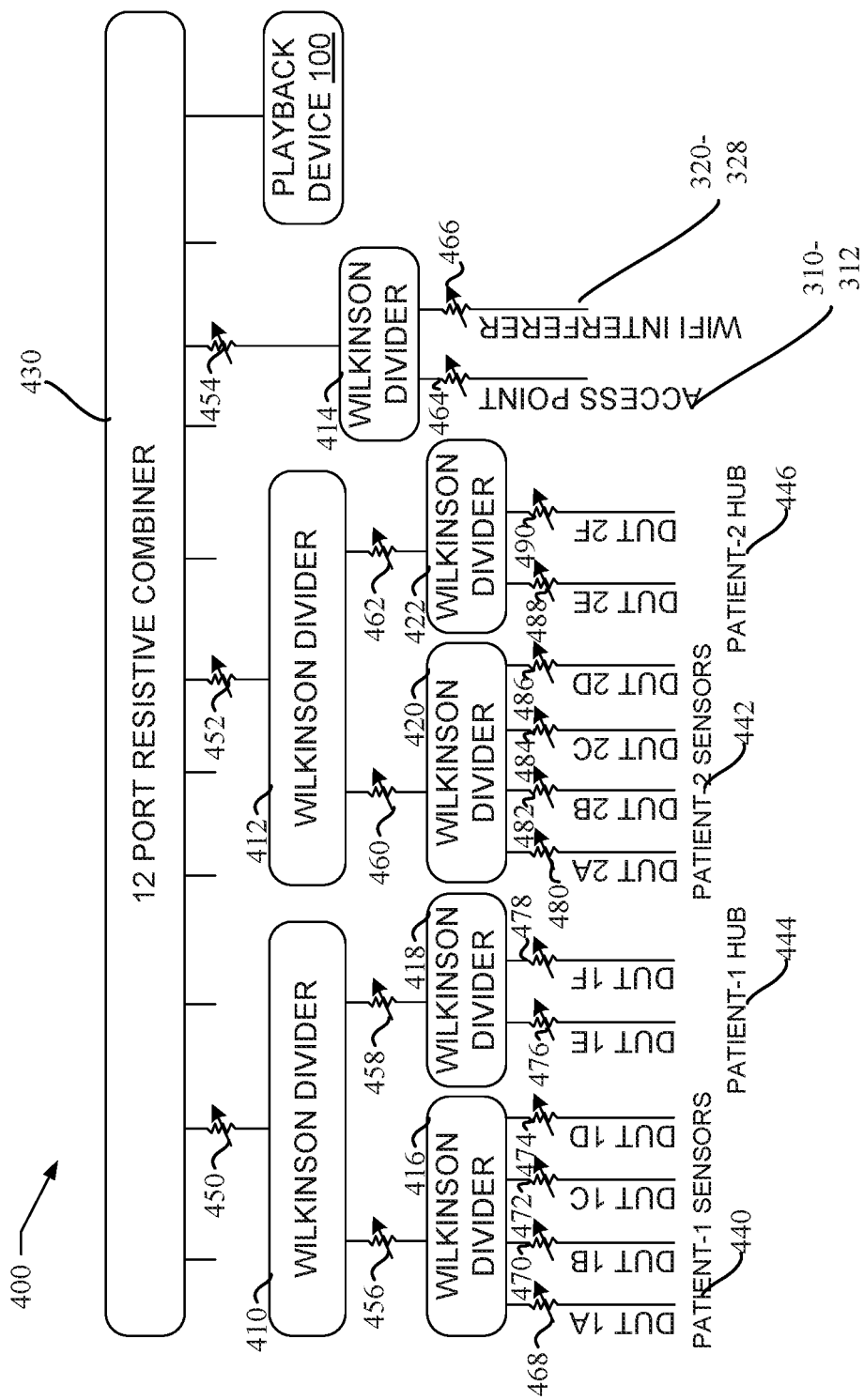
FIG. 4 depicts an example wireless test bed apparatus to which the radio box apparatus of FIGS. 1A-1B can be connected.

Using the example apparatus 100, the RF spectrum in environment 300 can be recorded over time and analyzed with respect to access points 310-312, devices 320-328, etc. The spectrum recorded over time can be processed by the radio box apparatus 100 and provided to a conductive RF test bed, such as the test bed 400 shown in FIG. 4. In certain examples, such as shown in FIG. 4, the radio box device 100 can be connected to the RF test bed 400. The example test bed apparatus 400 includes a plurality of power divider/combiner circuits 410-422 (e.g., Wilkinson divider circuits, etc.) connected to a resistive combiner 430. The resistive combiner 430 is a resistor-based circuit used to combine outputs from the plurality of power divider/combiner circuits 410-422 to form a network (e.g., a mesh network, etc.) among the inputs to the combiner 430.

The divider/combiner circuits 410-422 can split an input signal into two equal-phase output signals or combine two equal-phase signals into a single signal in the opposite direction. For example, two quarter-wave transformers can match split ports to a common port, and a resistor isolates the split ports. The circuits 410-422 thus provide a low loss level while maintaining a high level of isolation between ports.

The resistive combiner 430 includes a plurality of symmetrical ports (e.g., twelve ports, etc.) to divide one RF signal equally among the ports or combine signals from the ports into a single output RF signal, for example. Thus, a plurality of radios can be connected to simulate a mesh network via the resistive combiner 430, for example. Depending on a desired/necessary bandwidth, one or more radios can be connected and configured to mimic a wireless signal environment such as the recorded environment 300.

In certain examples, the test bed apparatus includes a plurality of attenuators 450-490. In certain examples, the attenuators 450-490 are programmable. Thus, for example, the attenuator 454 connecting the divider/combiner 414 to the resistive combiner 430 can be program to emulate a fading of wearable devices relative to the access point 310, 312, which is superimposed on top of the RF environment that is generated by the playback of captured signal information from the apparatus 100.

A recorded output from the playback device 100 can be compared to input captured from a variety of sources including medical body area networks (MBANs) including patient sensors 440, 442 and patient hubs 444, 446, as well as signals from the access points 310, 312 and interfering devices 320-328, for example. In addition to playback, a signal processing equation can be provided to the test bed system 400, and the equation can be played back with the recorded signal information to determine a result of the equation in the particular recorded environment. For example, an equation quantifying line of sight RF signal path loss, multipath, or interference level can be fed/injected/otherwise input into the test bed 400, which is mimicking the recorded environment 300, and the test bed 300, working with the radio apparatus 100, can determine a solution to the equation in the environment 300. Based on the test bed 400 simulation, the probable outcome in the actual environment 300 is known because the test bed 400 operates on a recording by the device 100 of the actual environment 300, for example. In certain examples, a recording of the environment 300 and additional instrument data (e.g., recorded by the device 100 and/or by another device/system, etc.) can be combined in the test bed environment 400 to evaluate a result of an equation in the recorded environment. For example, a path loss model can be created from equation(s) and recorded data and played back via the instrument 400. Thus, playback signals generated by equation(s) (e.g., synthesis) can allow extreme conditions to be created to test failure limits of communication devices in the test bed 400.

In certain examples, the MBANs can switch communication between an industrial, scientific and medical (ISM) (e.g., 2.4-2.4835 GHz) frequency band and an MBAN (e.g., 2.36-2.4 GHz) frequency band. MBAN devices can operate in the ISM spectrum, which is often shared with other medical and non-medical devices. To improve the reliability of data delivery, MBAN devices can operate in the MBAN portion of the frequency spectrum on a secondary basis. That is, MBAN devices are to obtain approval from a primary user of the MBAN spectrum in order to (conditionally) use the increased MBAN frequency band. For example, while operating in a healthcare facility, such as a hospital, clinic, doctor's office, pharmacy, etc., MBAN devices have access to the protected frequency spectrum of the MBAN (2.36-2.39 GHz) pending permission from the primary user, frequency coordinator, etc. An MBAN device is to evacuate the MBAN spectrum when the MBAN spectrum is requested back by the primary user and/or when the MBAN device stops receiving control messages (e.g., from a frequency coordinator, etc.) which carry information regarding the MBAN spectrum usage, for example.

The playback device 100 can include three SDR devices 110-114 operating in a 100-200 MHz range to cover the entire MBAN and ISM bands in one recording session, for example. If only 40 MHz is to be recorded, however, the device 100 can determine that only one radio 110-114 is to be used. The device 100 determines, based on user input, configuration, signal analysis, etc., a desired bandwidth for recording and activates or deactivates the radios 110-114 accordingly. The activated radio(s) 110-114 can then be configured to record the target/desired/determined bandwidth of signal activity in the environment, for example.

The test bed infrastructure 400 can include a variety of radios (e.g., 3 radios, 5 radios, 10 radios, 50-60 radios, etc.) defined in hardware, software, and/or firmware connected to wireless (e.g., WiFi, Bluetooth, etc.) networking to create a wireless environment inside the test bed infrastructure 400. The spectrum recording device 100 can be taken to a healthcare environment 300, such as a hospital, clinic, surgical center, doctor's office, etc., to record a "real life", actual wireless signal environment and convert that signal environment into a model. Then, rather than a theoretical, estimated interpretation of interference that a device 320-328 is likely to encounter or access points 310-312 the device 320-328 is likely to see, a model can be generated from an actual recording of device(s) 320-328, access point(s) 310-312, and wireless traffic in the environment 300, for example.

Figure 5:
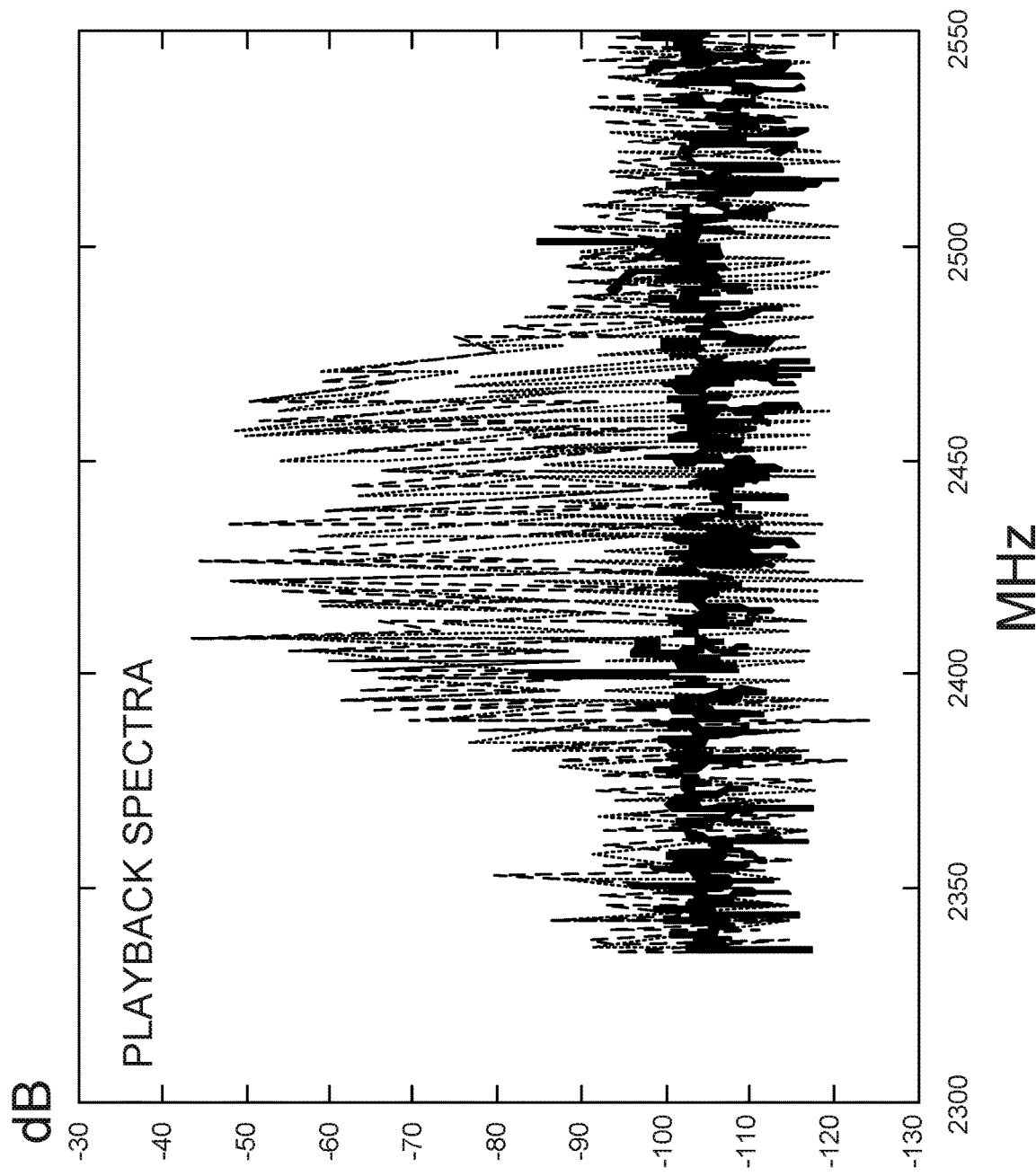
FIG. 5 shows an example plot of a recorded signal spectrum at a certain time.

In certain examples, recorded spectra from various locations and times can be linearly superimposed in different combinations of spatial and temporal conditions to provide limit test cases (e.g., corner cases) for the RF conductive testbed 400. Further, the spectrum can be modeled statistically with parameters tuning different spectral and temporal behavior of the RF environment 300 to further synthesize corner cases. An example of a spectrum recorded over five minutes (in which the temporal dimension is flattened) is shown in FIG. 5. As illustrated in FIG. 5, signal strength at a plurality of frequencies can be mapped from the recorded spectrum and used to evaluate wireless communication traffic, congestion, available frequency(-ies) and bandwidth(s), etc. Additionally, in certain examples, the system 100 can be paired with a known RF source that sweeps through a large bandwidth and provides a path loss profile/model of the indoor environment 300. The recorded path loss profiles (and/or fading/multipath profiles) can be synthesized in different combinations of temporal and spatial conditions by programmable attenuators 160-164 that control the path loss of the devices in the RF conductive network testbed 400, for example.

As an example, the recording and playback system 100 can be taken to a hospital (e.g., hospital environment 300, etc.), and the recording can be performed at multiple times for a continuous recording duration at multiple locations, which usually are based on the use case of a wireless device 320-328 under test. A recording duration is limited by the data storage size of the laptop attached to the device 100, for example. In certain examples, the system 100 records and compresses data at 15 GB/s. The recorded data thus represents the environment 300 that the wireless devices under test 320-328 should receive. The recorded spectrum over time is then processed and transmitted back to the conductive RF test bed 400.

Thus, the device 100 collects real-time (or substantially real-time given data acquisition, processing, storage, and/or transmission latency) spectral data that represents an RF environment 400 in which medical devices 320-328 operate. A parametric RF path loss model can be created based on passive RF system measurements using from simple linear superposition to statistical analysis. Automated system level tests are subject to systematic errors. Systematic errors can be avoided by including randomized components in the parametric model. Then, dynamic RF path loss modeling can be implemented with programmable RF attenuators and control software in a conductive RF test bed 400.

Thus, certain examples provide a portable, low cost apparatus 100 that can easily be deployed in one or more systems 100 at the same time (or substantially the same time given placement and/or device latency, etc.) in high traffic, restrictive environments 300 such as hospitals, etc. Certain examples provide a large bandwidth and large dynamic range (e.g., 40 dB, etc.) for recording. In certain examples, recorded spectra can be superimposed in various combinations to generate extreme interference levels and path loss for the conductive test bed 400.

Using the test bed 400 and device 100, a combination of spectra for the monitored environment 300 can be modeled over time at different time rates to synthesize typical and corner cases of performance for one or more wireless devices 320-328 under test. Tests can be performed conductively via the test bed 400 to help ensure reliability, for example. The test bed platform 400 can be customized for different environments and can be used to enhance development and quality testing for next generation wireless medical devices.

Figure 6:
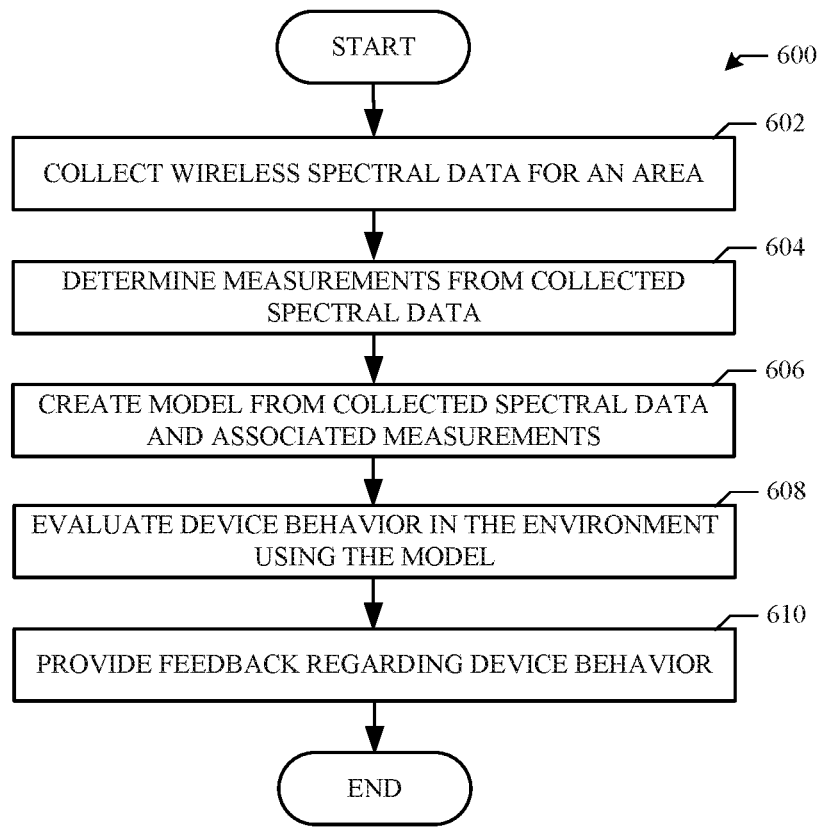
FIG. 6 illustrates a flow diagram for an example method to model signal traffic in a healthcare environment using the radio apparatus of FIGS. 1A-1B.

FIG. 6 illustrates a flow diagram for an example method 600 to model signal traffic in the healthcare environment 300 using the radio apparatus 100. At block 602, RF spectral data is collected for an area/environment. For example, the apparatus 100 is configured to collect real time RF spectral data in the environment 300 including wireless medical devices 320-328 using its antenna 160-164 and associated radios 110-114, which can be hardware- and/or software-defined radios.

At block 604, measurements are determined from the collected spectral data. For example, passive RF system measurements can be obtained using a variety of techniques including linear superposition, statistical analysis, etc. For example, linear superposition determines a net response at a given location and time as a sum of effects of RF signals measured at that location and time.

At block 606, a model is created based on the collected spectral data and associated measurements. For example, a parametric RF path loss model is created based on the passive RF system measurements using techniques such as simple linear superposition, statistical analysis, etc. As another example, randomized components can be included in the parametric model to reduce systematic errors and implement dynamic RF path loss modeling with programmable RF attenuators and control software in the conductive RF test bed 400.

More specifically, a model of RF signal activity in the environment 300 can be formed by linearly superimposing the recorded spectra from various locations and times in different combinations of spatial and temporal conditions to provide limit test cases (e.g., corner cases) for the RF conductive testbed 400. Alternatively or in addition, the recorded spectrum can be modeled statistically with parameters tuning different spectral and temporal behavior of the RF environment 300 to further synthesize corner cases (e.g., resulting in the data set displayed via a graphical user interface such as shown in the example of FIG. 5, etc.).

Additionally, the system can be paired with a known RF source that sweeps through a large bandwidth and produces a path loss profile of the indoor environment 300. The recorded path loss profiles (and/or fading/multipath profiles) can be synthesized in different combinations of temporal and spatial conditions by programmable attenuators that control the path loss of the devices 320-328 in the RF conductive network (testbed) 400, for example.

At block 608, the model is used to evaluate behavior/performance of one or more wireless device(s) 320-328 in the environment 300. For example, the test bed 400 can be used with the apparatus 100 to determine how a given device or set of devices operates in such an environment 300 based on the model. Wireless communication can be enabled via the test bed 400 according to the model of the "real world" environment 300. That is, given an understanding of the frequency(-ies) and communication occurring in the environment 300, the model can be used to simulate and predict any conflicts and/or other difficulties a device 320-328 is likely to have when operating and communicating in the environment 300.

At block 610, feedback can be provided regarding one or more wireless device(s) 320-328 under test in the environment 300. For example, a configuration for the device 320-328 can be generated based on the model of RF signal activity/behavior in the environment 300. One or more settings can be suggested and/or transmitted to the device 320-328 to adjust device 320-328 configuration based on the model, for example. Output can be provided for new product design (e.g., to improve performance, communication reliability, usability, effectiveness, etc.) based on the advantages and disadvantages of operating the wireless medical device(s) 320-328 with its configuration in the modeled environment 300, for example.

Thus, certain examples provide apparatus, systems, devices, and associated methods to record and play back a picture of wireless communications and interference (e.g., wireless RF signal traffic) in a given environment 300. The picture or model of the environment 300 can be used inside a test environment (e.g., testbed 400) to test radio(s) and communication protocol(s) without actually being in the environment 300 (e.g., without actually going to a hospital to test a new radio configuration and/or communication protocol, etc.). Thus, the modeling apparatus 100 is portable and can be brought to the environment 300 to create a model of the environment 300, which can then be brought back to the test bed 400 and connected to the test bed 400 for simulation and analysis of connected radios (and associated protocols), for example.

A configuration and/or other input can be provided to the device 100, and the device configures the radios to record a particular frequency spectrum specified in the input. For example, a configuration input of 40 MHz from frequency x to frequency y is provided to the device 100, and the radios 110-114 are configured to record that particular spectrum. In certain examples, depending on requested bandwidth, all available radios can be used to record the target frequency spectrum(-a). For example, ten radios 110-114 can be used in parallel to record 1 GHz, ten radios 110-114 can be used in parallel to record 40 MHz, three radios 110-114 can be used in parallel to record 40 MHz, three radios 110-114 can be used to record 120 MHz of bandwidth, etc. Multiple radios 110-114 can be defined and/or otherwise configured to capture spectrum from different angles/perspectives (e.g., looking at different frequencies, different signal strengths, different parts of the room, etc.), which can then be combined (e.g., using the combiner 120) to provide a picture of the environment 300. A pathless model and/or other model can be superimposed on the recorded spectrum(-a) during playback, for example.

Thus, certain examples configure one or more processors (e.g., processor 170, etc.) in a portable device and transform the device and its processor(s) into a customized, special-purpose apparatus to capture a realistic picture of wireless communication activity in an environment and translate the captured recording into a model for simulation with respect to one or more wireless devices. The specially configured apparatus drives a test bed to which one or more devices can be connected for simulation and/or other testing in the modeled environment, for example.

Figure 7:
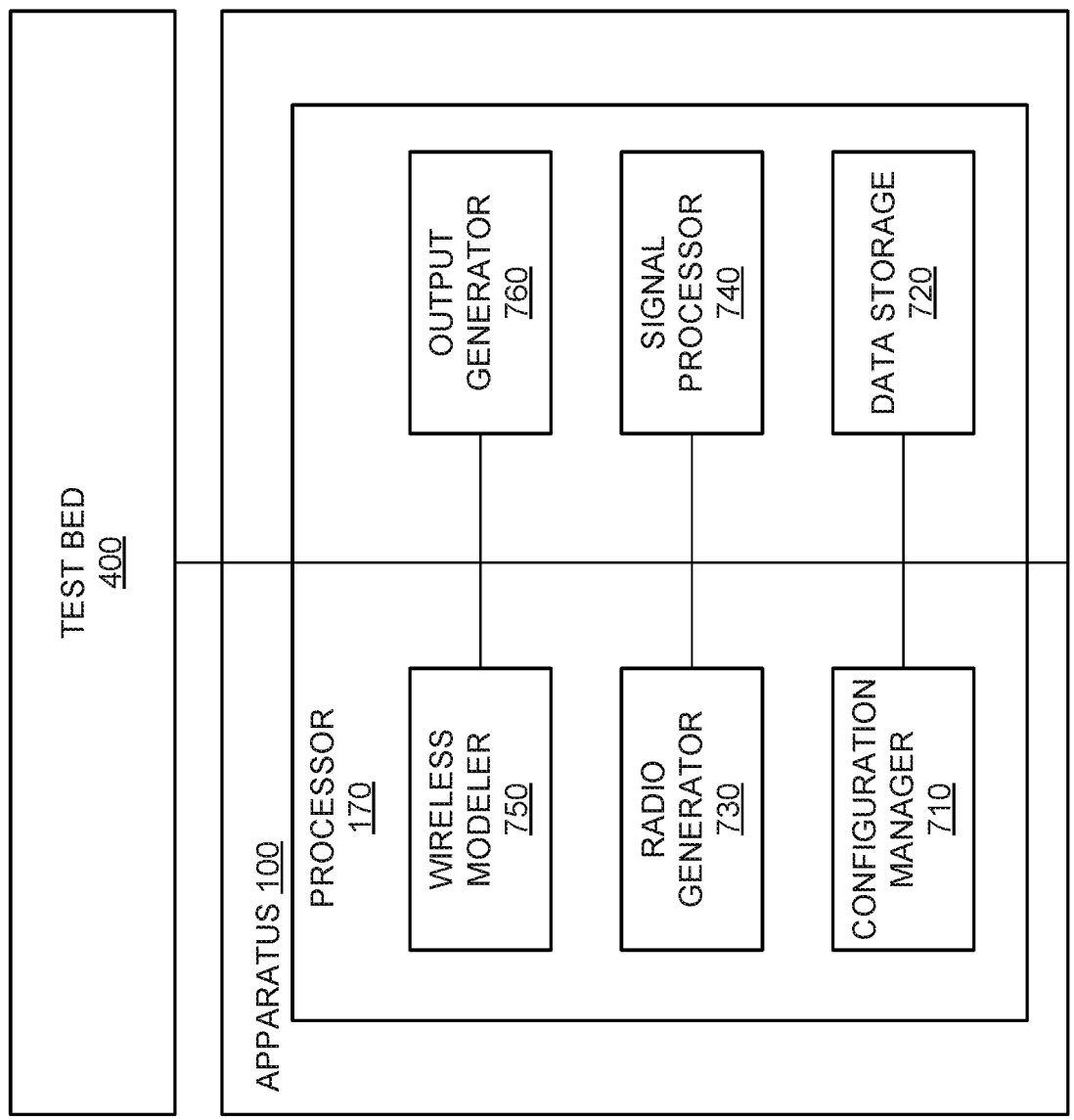
FIG. 7 illustrates a block diagram of an example processor of FIG. 1B transformed by executable instructions to become a special-purpose radio capture and recording device.

FIG. 7 illustrates a block diagram of the example processor 170 transformed by executable instructions to become a special-purpose radio capture and recording device 170 including a configuration manager 710, a data storage 720, a radio generator 730, a signal processor 740, a wireless modeler 750, and an output generator 760. The configuration manager 710 takes as input one or more desired center frequencies, acquisition bandwidth, signal processing/modeling equations, etc. The configuration manager 710 can store the input information in the data storage 720 and retrieve configuration/setting/parameter information from the data storage 720, for example. The configuration manager 710 works with the radio generator 730 to generate one or more SDRs 110-114 based on the desired configuration (e.g., frequency(-ies), bandwidth(s), equation, etc.). Using the radio generator 730, one or more software defined radios 110-114 can be generated including mixers, filters, amplifiers, modulators/demodulators, detectors, etc., can be implemented in the example processor 700.

The SDR(S) 110-114 of the radio generator 730 capture wireless signal(s) in the environment 300 corresponding to target center frequency(-ies) and bandwidth(s) according to the configuration provided by the configuration manager 710. Data representing captured wireless traffic and/or other RF signal information is stored in the data storage 720. The signal processor 740 can process data captured by the radio(s) of the radio generator 730 and convert signal waveforms to data representing the signals for storage and/or further processing, for example. The signal processor 740 can apply one or more equations to the captured, recorded signal information, for example. The signal processor 740 can work with the wireless modeler 750 to generate a wireless signal model of the recorded environment 300, for example.

The wireless modeler 750 forms a model from the recorded signal information to allow a device, such as the test bed device 400 to recreate the wireless conditions of the environment 300 for one or more devices under test, for example. Thus, actual conditions of the environment 300 can be reproduced to test behavior, configure, tweak design, etc., of a design that is not actually in that environment 300. The model can be provided to the test bed 400 and/or other apparatus by the output generator 760, for example. For example, in the example of FIG. 4, the processor 700 can be included in the playback device 100 to provide the model in which to simulate communication activity among a plurality of connected device(s) 440-446.

Thus, certain examples solve problems with accurate modeling of wireless activity in an environment by providing a novel device to record wireless signal activity in a monitored environment and generate a usable model of wireless communication conditions of that environment. Certain examples facilitate application of the model to one or more devices under test via a test bed apparatus. Certain examples enable signal processing equations and/or other parameters to be applied to the wireless environment model to impact device(s) being tested in the modeled environment via the test bed. Certain examples provide a flexible, scalable signal recording device that can be positioned in an environment to be recorded. For example, the device can be placed at a location in the environment and/or moved around (e.g., walked around, etc.) the environment to capture wireless signal traffic/congestion information, etc. Based on a frequency input (e.g., a specified center frequency and/or bandwidth, a detected center frequency and/or bandwidth, etc.), the device is configured to record wireless signal information (e.g., RF wireless signal information, etc.) in the environment and convert the recording to a model, for example. The model can be used to facilitate performance evaluation and testing of wireless communication devices while experiencing emulated RF conditions according to wireless signal activity in an environment of interest, for example.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not listed may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

Figure 8:
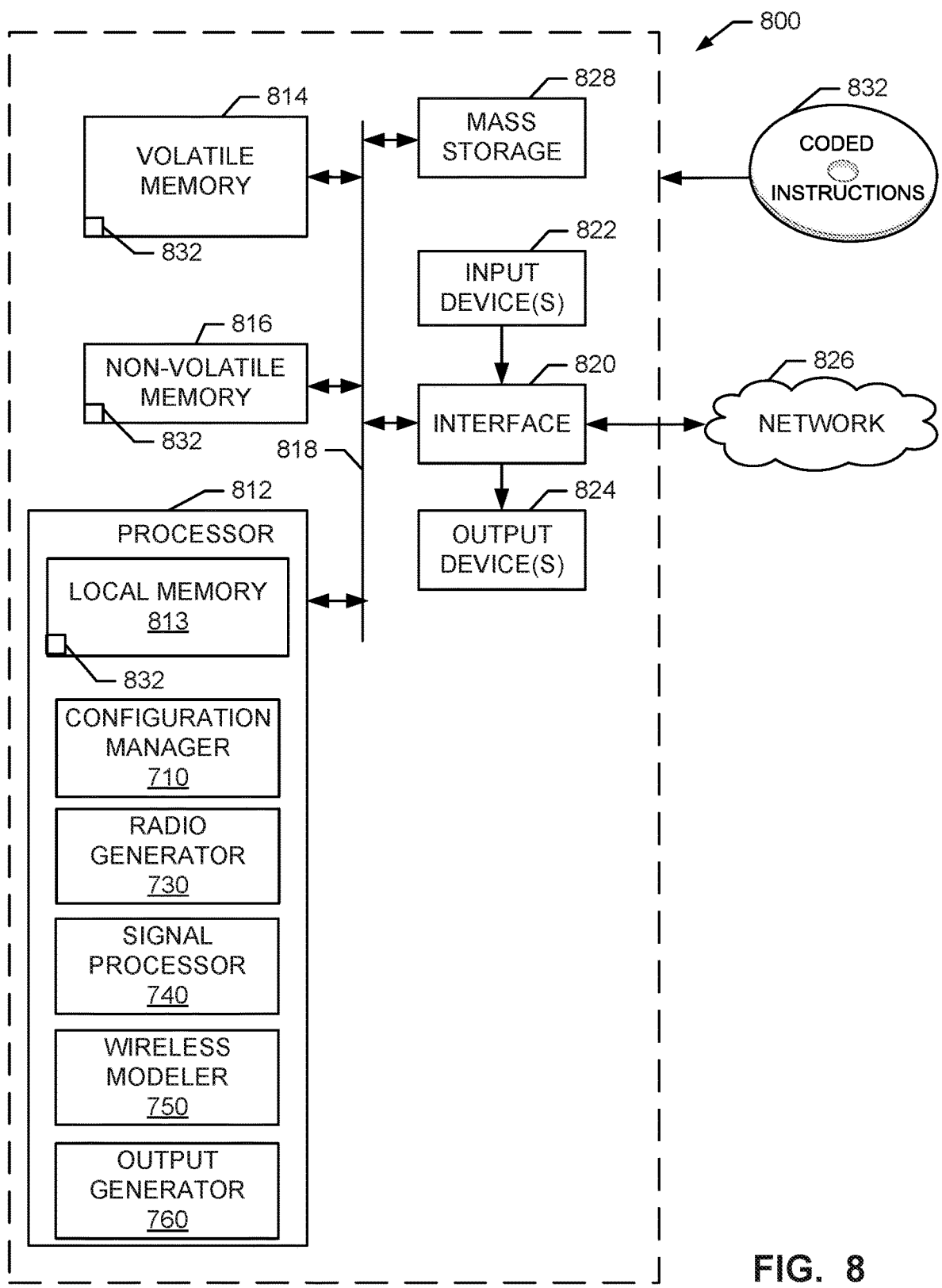
FIG. 8 is a block diagram of an example processor platforms that can execute instructions to implement the example systems and methods of FIGS. 1-7.

FIG. 8 is a block diagram of an example processor platform 800 that can execute instructions to implement the example systems and methods of FIGS. 1-7. The processor platform 800 can be, for example, a server, a personal computer, a mobile device (e.g., a cell phone, a smart phone, a tablet such as an IPAD™), a personal digital assistant (PDA), an Internet appliance, or any other type of computing device.

The processor platform 800 of the illustrated example includes a processor 812. Processor 812 of the illustrated example is hardware. For example, processor 812 can be implemented by one or more integrated circuits, logic circuits, microprocessors or controllers from any desired family or manufacturer.

Processor 812 of the illustrated example includes a local memory 813 (e.g., a cache). Processor 812 of the illustrated example is in communication with a main memory including a volatile memory 814 and a non-volatile memory 816 via a bus 818. Volatile memory 814 can be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 can be implemented by flash memory and/or any other desired type of memory device. Access to main memory 814, 816 is controlled by a memory controller. The processor 812, alone or in conjunction with the memory 813, can be used to implement the processor 170 including its configuration manager 710, data storage 720, radio generator 730, signal processor 740, wireless modeler 750, output generator 760, and/or other part of the systems disclosed herein.

Processor platform 800 of the illustrated example also includes an interface circuit 820. Interface circuit 820 can be implemented by any type of interface standard, such as an Ethernet interface, a universal serial bus (USB), and/or a PCI express interface.

In the illustrated example, one or more input devices 822 are connected to the interface circuit 820. Input device(s) 822 permit(s) a user to enter data and commands into processor 812. The input device(s) 822 can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to interface circuit 820 of the illustrated example. Output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). Interface circuit 820 of the illustrated example, thus, typically includes a graphics driver card, a graphics driver chip or a graphics driver processor.

Interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

Processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 associated with any of FIGS. 1-7 can be stored in mass storage device 828, in volatile memory 814, in the non-volatile memory 816, and/or on a removable tangible computer readable storage medium such as a CD or DVD.

It may be noted that operations performed by the processor platform 800 (e.g., operations corresponding to process flows or methods discussed herein, or aspects thereof) may be sufficiently complex that the operations may not be performed by a human being within a reasonable time period.

From the foregoing, it will be appreciated that example methods, apparatus and articles of manufacture have been disclosed that provide a portable spectrum recording and playback apparatus, an associated site model, and associated process. The disclosed methods, apparatus and articles of manufacture improve the efficiency of using a computing device by capturing, analyzing, and modeling wireless signal activity and using the modeled activity to test and develop wireless communication devices. The disclosed methods, apparatus and articles of manufacture are accordingly directed to one or more improvement(s) in the functioning of a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a scalable plurality of radios dynamically configurable to capture wireless signal information occurring in an environment at a first location;
   a processor to dynamically select, activate, and configure one or more of the plurality of radios according to at least one of a center frequency or a bandwidth to capture the wireless signal information associated with the at least one of a center frequency or a bandwidth, the processor to generate a model of wireless signal activity and associated communication spectrum in the environment based on the captured wireless signal information, the model to facilitate testing, at a second location apart from the first location, of a device according to the modeled wireless signal activity from the environment; and
   a data storage to store a recording of the captured wireless signal information and the model,
   wherein the apparatus is to be portable to be a) positioned in the environment at the first location to capture the wireless signal information in the environment according to the one or more of the plurality of radios activated and configured by the processor for the environment and b) movable to the second location to connect to the device and to facilitate testing of the device at the second location according to the model and the recording of the captured wireless signal information to simulate operation of the device and an associated protocol in the model of the environment of the first location.

2. The apparatus of claim 1, wherein the plurality of radios includes a plurality of software-defined radios configurable by the processor to operate as one or more radios based on the at least one of a center frequency or a bandwidth.

3. The apparatus of claim 1, further including an antenna and an attenuator associated with each of the plurality of radios.

4. The apparatus of claim 1, wherein the model is to include a path loss model.

5. The apparatus of claim 1, wherein the processor is to determine a number of the plurality of radios to activate and configure based on a bandwidth available to be recorded at the environment.

6. The apparatus of claim 1, wherein the processor is to include:
 a configuration manager to determine a configuration for the one or more radios;
 a radio generator to apply the configuration to the plurality of radios to activate and configure the one or more radios;
 a signal processor to process the wireless signal information captured by the one or more radios;
 a wireless modeler to form the model of wireless signal activity from the processed wireless signal information; and
 an output generator to provide the model for at least one of simulation or analysis.

7. The apparatus of claim 1, further including a test bench to connect a device and simulate operation of the device using the model of wireless signal activity.

8. The apparatus of claim 7, wherein the processor is to input an equation into the test bench to determine a result of the equation in the model of wireless signal activity for the environment.

9. At least one non-transitory computer-readable storage medium including instructions that, when executed, cause at least one processor to implement at least:
 a configuration manager to determine a configuration for one or more of a scalable plurality of radios to capture wireless signal information occurring in an environment at a first location;
 a radio generator to apply the configuration to the plurality of radios to dynamically select, activate, and configure the one or more radios according to at least one of a center frequency or a bandwidth to capture the wireless signal information associated with the at least one of a center frequency or a bandwidth;
 a signal processor to process a recording of the wireless signal information captured by the one or more radios;
 a wireless modeler to generate a model of wireless signal activity and associated communication spectrum in the environment from the processed wireless signal information, the model to facilitate testing, at a second location apart from the first location, of a device according to the modeled wireless signal activity from the environment; and
 an output generator to provide the model for at least one of simulation or analysis,
 wherein the at least one processor is to be portable to be a) positioned in the environment at the first location to capture the wireless signal information in the environment according to the one or more of the plurality of radios activated and configured by the processor for the environment and b) movable to the second location to connect to the device and to facilitate testing of the device at the second location according to the model and the recording of the captured wireless signal information to simulate operation of the device and an associated protocol in the model of the environment of the first location.

10. The storage medium of claim 9, wherein the plurality of radios includes a plurality of software-defined radios configurable by the at least one processor to operate as one or more radios based on the at least one of a center frequency or a bandwidth.

11. The storage medium of claim 9, wherein the model is to include a path loss model.

12. The storage medium of claim 9, wherein the instructions, when executed, cause the at least one processor to determine a number of the plurality of radios to activate and configure based on a bandwidth available to be recorded at the environment.

13. The storage medium of claim 9, wherein the instructions, when executed, further cause the at least one processor to initiate simulation of operation of a device using the model of wireless signal activity and a test bench.

14. The storage medium of claim 13, wherein the instructions, when executed, further cause the at least one processor to input an equation into the test bench to determine a result of the equation in the model of wireless signal activity for the environment.

15. A method comprising:
 determining, using at least one processor, a configuration for one or more of a scalable plurality of radios to capture wireless signal information occurring in an environment at a first location;
 applying, using the at least one processor, the configuration to the plurality of radios to dynamically select, activate, and configure the one or more radios according to at least one of a center frequency or a bandwidth to capture the wireless signal information associated with the at least one of a center frequency or a bandwidth;
 processing, using the at least one processor, a recording of the wireless signal information captured by the one or more radios;
 generating, using the at least one processor, a model of wireless signal activity and associated communication spectrum in the environment from the processed wireless signal information, the model to facilitate testing, at a second location apart from the first location, of a device according to the modeled wireless signal activity from the environment; and
 outputting, using the at least one processor, the model for at least one of simulation or analysis,
 wherein the at least one processor is to be portable to be a) positioned in the environment at the first location to capture the wireless signal information in the environment according to the one or more of the plurality of radios activated and configured by the processor for the environment and b) movable to the second location to connect to the device and to facilitate testing of the device at the second location according to the model and the recording of the captured wireless signal information to simulate operation of the device and an associated protocol in the model of the environment of the first location.

16. The method of claim 15, wherein the plurality of radios includes a plurality of software-defined radios configurable using the at least one processor to operate as one or more radios based on the at least one of a center frequency or a bandwidth.

17. The method of claim 15, wherein the model is to include a path loss model.

18. The method of claim 15, further including determining a number of the plurality of radios to activate and configure based on a bandwidth available to be recorded at the environment.

19. The method of claim 15, further including initiating simulation of operation of a device using the model of wireless signal activity and a test bench.

20. The method of claim 19, further including inputting an equation into the test bench to determine a result of the equation in the model of wireless signal activity for the environment.

* * * * *